United States Patent [19]
Atake

[11] Patent Number: 6,045,738
[45] Date of Patent: Apr. 4, 2000

[54] SHEET-DECORATING INJECTION MOLDING METHOD

[75] Inventor: Hiroyuki Atake, Tokyo-To, Japan

[73] Assignee: Dai Nippon Printing Co., Ltd., Tokyo-To, Japan

[21] Appl. No.: 08/960,907

[22] Filed: Oct. 30, 1997

[30] Foreign Application Priority Data

Oct. 31, 1996 [JP] Japan .................................. 8-290669

[51] Int. Cl.⁷ ............................................. B29C 45/14
[52] U.S. Cl. ...................... 264/266; 264/511; 264/513; 264/267; 475/112; 475/127; 475/129.1; 475/388
[58] Field of Search .................................. 264/266, 513, 264/553, 267, 511; 475/112, 127, 129.1, DIG. 47, 436 RM, 388

[56] References Cited

U.S. PATENT DOCUMENTS

| | | | |
|---|---|---|---|
| 4,582,665 | 4/1986 | Jabarin | 264/553 |
| 5,415,536 | 5/1995 | Ohno | 425/121 |
| 5,730,825 | 3/1998 | Atake | 156/246 |

FOREIGN PATENT DOCUMENTS

| | | |
|---|---|---|
| 4033297 | 10/1990 | Germany . |
| 62-119014 | 5/1987 | Japan . |
| 63-297011 | 5/1988 | Japan . |
| 6315950 | 11/1994 | Japan . |
| 08183064 | 7/1996 | Japan . |

OTHER PUBLICATIONS

European Search Report, dated Feb. 26, 1998.

*Primary Examiner*—Jan H. Silbaugh
*Assistant Examiner*—Edmund H. Lee
*Attorney, Agent, or Firm*—Morgan & Finnegan, L.L.P.

[57] ABSTRACT

A sheet-decorating injection molding method using a sheet clamper for fixedly holding a decorative sheet on a parting surface of a movable mold of an injection mold. At least the inner edges of the surfaces facing the movable mold of the sheet clamper are finished in smooth, convexly curved surfaces, respectively, and a groove for receiving the sheet clamper therein is formed in a fixed mold at a position corresponding to the sheet clamper in a depth sufficient to permit the movement of the sheet clamper between a position to hold the decorative sheet fixedly on the parting surface of the movable mold and a position to be separated from the decorative sheet in state where the injection mold is clamped. The sheet clamper fixedly holding the decorative sheet is moved away from the parting surface of the movable mold and separated from the decorative sheet to release the decorative sheet at a timing during a period between completion of a mold clamping process and the start of a mold opening process and is moved further away from the parting surface of the movable mold as the movable mold is moved further away from the fixed mold after the start of a mold opening process.

2 Claims, 6 Drawing Sheets

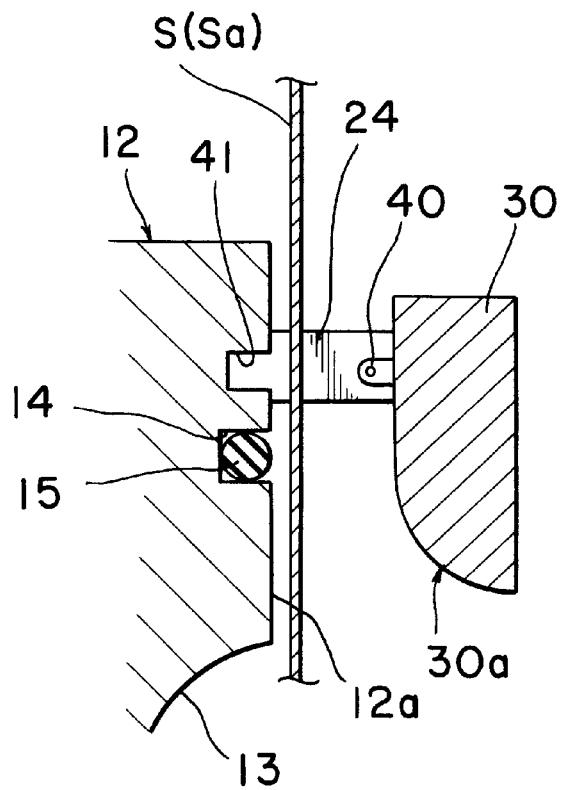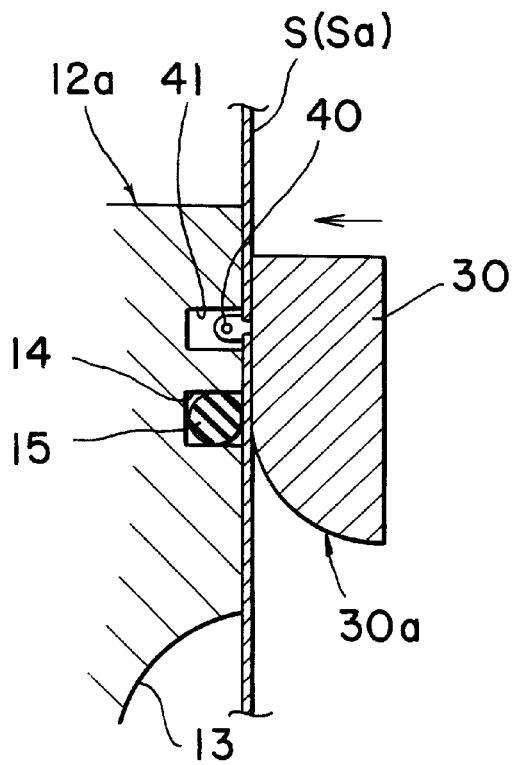
FIG. 6(A)   FIG. 6(B)
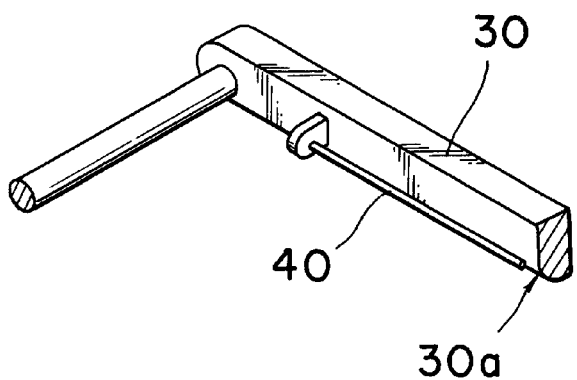
FIG. 7

SHEET-DECORATING INJECTION MOLDING METHOD

BACKGROUND OF THE INVENTION

1. Field of the Invention

The present invention relates to a sheet-decorating injection molding apparatus for forming a molding decorated with patterns and letters by bonding a decorative sheet to the surface of a resin molding in a mold when producing the resin molding by injection molding, and a sheet-decorating injection molding method for the sheet-decorating injection molding.

2. Description of the Related Art

Various sheet-decorating injection molding methods which bond a decorative sheet to the surface of a resin molding in a process of forming the resin molding in a mold by injection molding have been proposed. Most of those previously proposed sheet-decorating injection molding methods carry out all or some of the following steps (a) to (j) in that order, in order of different sequence of those steps, or carry out a plurality of steps among those steps (a) to (j) simultaneously or in parallel.

Step a: A sheet feed process for feeding a decorative sheet into a space between a movable mold (usually, a female mold) and a fixed mold (usually, a male die) forming an injection mold Step b: A sheet fixing process for fixing the decorative sheet to the parting surface of the movable mold by pressing the decorative sheet with a sheet clamper Step c: A sheet cutting process for cutting off the decorative sheet located on the parting surface of the movable mold from a web if decorative sheets are fed in a web unwound from a roll Step d: A sheet softening process for softening the decorative sheet by heating the same by a hot plate or the like Step e: A sheet drawing process for drawing the decorative sheet so that the decorative sheet extend along the inner surface of the female mold defining a cavity by vacuum forming or pneumatic forming (Preforming process)

Step f: A mold clamping process for moving the movable mold toward the fixed mold to close the injection mold Step g: An injection molding process for forming a molding by injecting a fluid resin (molten resin) through the fixed mold into the cavity defined by the movable mold and the fixed mold, and making the fluidized resin injected into the cavity Step h: A mold opening process for separating the movable mold from the fixed mold to open the injection mold Step i: A trimming process for removing unnecessary portions of the decorative sheet from a portion of the same bonded to the resin molding Step j: A molding removing process for removing a sheet-decorated molding from the injection mold A plurality of processes among the foregoing processes may be carried out simultaneously. For example, the sheet fixing process of Step b and the mold clamping process of Step f can be achieved simultaneously by fixedly holding the decorative sheet between the movable mold and the fixed mold by the mold clamping process of Step f. The sheet drawing process of Step e and the injection molding process of Step g can be achieved simultaneously if the decorative sheet is drawn by the heat and pressure of the molten resin injected into the cavity in the injection molding process.

Either a laminated decorative sheet or a transfer decorative sheet is used selectively as the decorative sheet according to the type of the sheet-decorated molding. If a laminated decorative sheet is used, the laminated decorative sheet is bonded integrally to the surface of the resin molding in a decorative layer. If a transfer decorative sheet is used, only a transfer layer, i.e., a decorative layer, of the transfer decorative sheet is transferred to the resin molding to form a decorative layer on the resin molding and a base sheet of the transfer decorative sheet is separated from the transfer layer.

When forming a sheet-decorated molding by a conventional sheet-decorating injection molding apparatus, the sheet clamper is held fixedly between the movable mold and the fixed mold during a period between the completion of the mold clamping process and the start of the mold opening process and, therefore, in most cases, the decorative sheet is pressed against and held fixedly on the parting surface of the movable mold by the sheet clamper during that period. Usually, the sheet-decorated molding, i.e., a resin molding solidified in the cavity and integrally provided with the decorative sheet, remains on the fixed mold, particularly when the fixed mold is provided with a cold runner, when the mold opening process is started, and portions of the decorative sheet fixedly held on the movable mold by the sheet clamper, i.e., portions of the decorative sheet not bonded to the resin mold, are separated from the fixed mold as the movable mold is retracted. Consequently, the decorative sheet is pulled so as to be peeled off the resin molding and there is a possibility that portions of the decorative sheet corresponding to the edges of the resin molding tend to be separated from the resin molding or the decorative sheet tends to be broken. Such a trouble is particularly serious with the laminated decorative sheet because the partial separation or the breakage of the laminated decorative sheet is connected directly with making the sheet-decorated molding defective.

FIGS. 8 and 9 illustrates an arrangement for avoiding such a trouble proposed in JP-A No. 6-315950. In this previously proposed arrangement, a movable mold 12 provided with a molding recess 13 and having a parting surface 12a is moved toward and away from a fixed mold 25, a sheet clamper 39 having the shape of a rectangular frame is disposed between the movable mold 12 and the fixed mold 25 to hold a decorative sheet S on the parting surface 12a of the movable mold 12, and a groove 29 for receiving the sheet clamper 39 therein is formed in the fixed mold 25 at a position corresponding to the sheet clamper 39 in a depth sufficient to permit the movement of the sheet clamper 39 between a position indicated by continuous lines in FIG. 9 to hold the decorative sheet S fixedly on the parting surface 12a of the movable mold 12 and a position indicated by alternate long and two short dashes lines in FIG. 9 to be separated from the decorative sheet S in a state where the movable mold 12 and the fixed mold 25 are joined together.

The sheet clamper 39 is pressed through the decorative sheet S against the parting surface 12a of the movable mold 12 at the completion of the mold clamping process, and sheet clamper 39 is retracted in the groove 29 to be separated from the decorative sheet S at the start of the mold opening process. Since the decorative sheet S is released from the sheet clamper 39, the decorative sheet S is able to be separated from the movable mold 12 and remain on the fixed mold 25 when the movable mold 12 is moved away from the fixed mold 25, so that the decorative sheet S may not be peeled off the resin molding Pa or may not be broken.

Although the sheet clamper 39 fixedly holding the decorative sheet S on the movable mold 12 is separated from the decorative sheet S at a timing during a period between the completion of the mold clamping process and the start of the mold opening process, a marginal portion Sb of the decorative sheet S around an effective portion Sa of the decorative sheet S bonded to the resin molding Pa, i.e., a portion of the decorative sheet extending between the frame-shaped sheet clamper 39 and the parting surface 12a of the movable mold 12, is caught by the sheet clamper 39 as shown in FIG. 8 as the movable mold 12 is moved away from the fixed mold 25. Consequently, a part of the effective portion Sa bonded to a portion of the resin molding Pa near the edge E of the sheet-decorated molding P is pulled intensely toward the movable mold 12 by the sheet clamper 39 moving away from the fixed mold 25 as the movable mold 12 is moved away from the fixed mold 25, and the portion of the decorative sheet S bonded to the resin molding Pa is separated from the portion near the edge E or broken.

The foregoing trouble may be avoided if a decorative sheet is held in place on the movable mold by, for example, suction without using the sheet clamper. However, if a decorative sheet were held by suction on the movable mold without using a mechanical sheet clamper, it would be possible that the decorative sheet cannot be satisfactorily drawn by the drawing process due to air leakage, or the decorative sheet is dislocated from a correct position on the movable mold and the decorative pattern of the decorative sheet cannot be correctly formed on the sheet-decorated molding.

SUMMARY OF THE INVENTION

Accordingly, it is an object of the present invention to provide a sheet-decorating injection molding apparatus capable of enabling a marginal portion of a decorative sheet to move smoothly through a space between a sheet clamper and a movable mold of an injection mold when the injection mold is opened to prevent the decorative sheet from peeling off a resin molding or being broken.

Another object of the present invention is to provide a sheet-decorating injection molding method for the sheet-decorating injection molding.

According to an aspect of the present invention, a sheet-decorating injection molding apparatus comprises, as principal components, an injection mold having a movable mold and a fixed mold, a sheet clamper for fixedly pressing a decorative sheet fed into a space between the movable mold and the fixed mold on a parting surface of the movable mold, and a mold operating means for moving the movable mold toward the fixed mold to clamp the injection mold and for moving the movable mold away from the fixed mold to open the injection mold.

At least the inner edges of surfaces facing the movable mold of the sheet clamper are finished in a convexly curved surface, and the fixed mold is provided in a portion thereof corresponding to the sheet clamper with a groove capable of receiving the sheet clamper therein and having a depth enough to permit the sheet clamper to be separated from the decorative sheet in a state where the injection mold is closed.

According to another aspect of the present invention, a sheet-decorating injection molding method to be carried out by the foregoing sheet-decorating injection molding apparatus moves the sheet clamper away from the movable mold in the groove of the fixed mold to separate the sheet clamper from the decorative sheet after the clamping of the injection mold and at least before the start of a mold opening operation.

Preferably, in the sheet-decorating injection molding method of the present invention, the distance between the sheet clamper and the parting surface of the movable mold is increased after the start of the mold opening process as the moving mold moves away from the fixed mold.

Although the groove of the fixed mold employed in the sheet-decorating injection molding apparatus of the present invention needs only a depth enough to enable the sheet clamper to be moved away from the parting surface of the movable mold so as to be separated from the decorative sheet, it is desirable that the groove has the greatest possible depth because the deeper the groove, the greater is the allowable stroke of the sheet clamper, and the easier for the marginal portion of the decorative sheet to slide past the sheet clamper.

The above and other objects, features and advantages of the present invention will become more apparent from the following description taken in connection with the accompanying drawings.

BRIEF DESCRIPTION OF THE DRAWINGS

FIGS. 6(A) and 6(B) are sectional views for assistance in explaining a sheet clamping action of a sheet clamper included in a modification of the sheet-decorating injection molding apparatus of FIG. 1;

FIG. 7 is a fragmentary perspective view of the sheet clamper shown in FIGS. 6(A) and 6(B);

DESCRIPTION OF THE PREFERRED EMBODIMENTS

Figure 1:
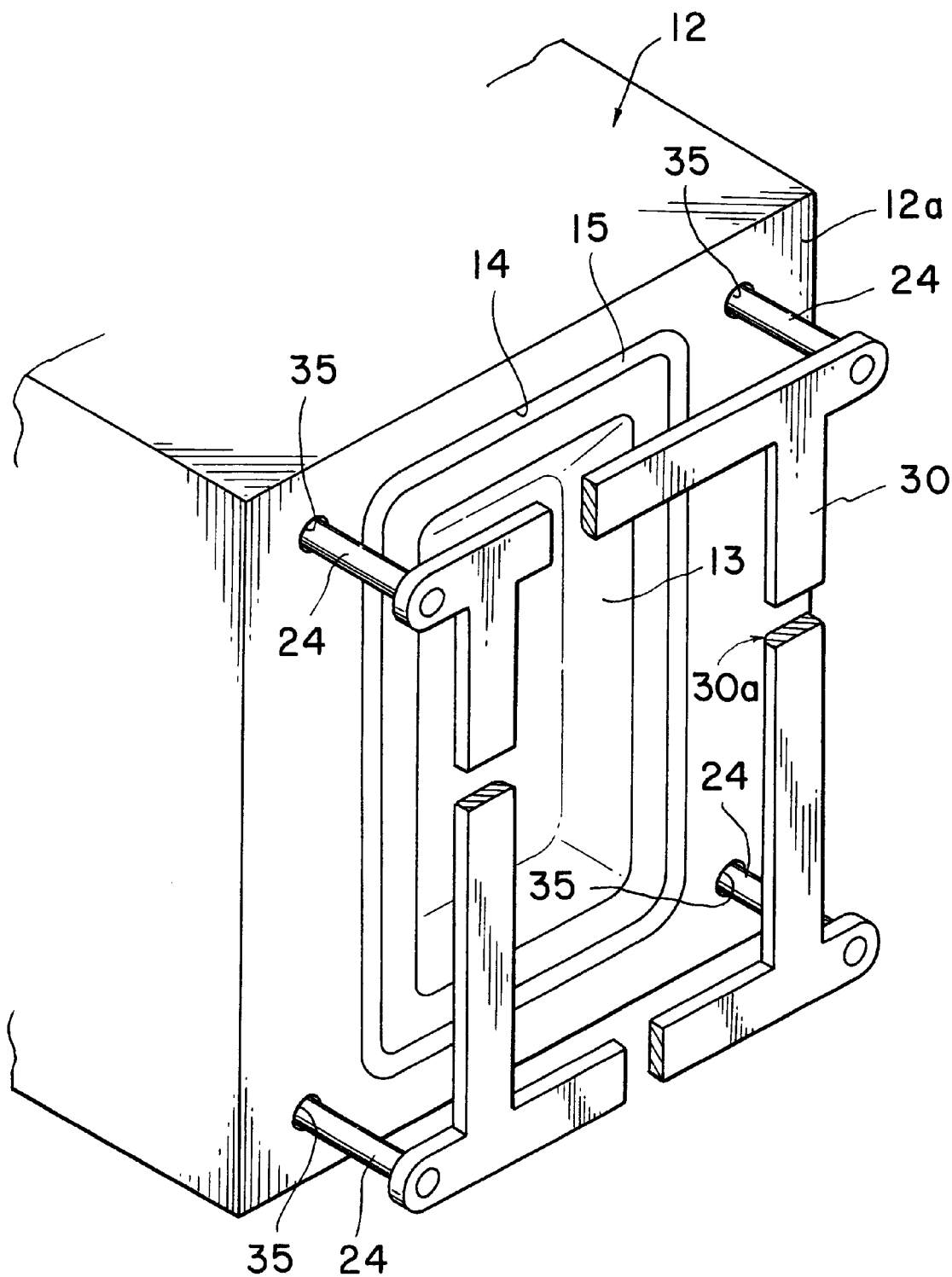
FIG. 1 is a fragmentary perspective view of a movable mold of an injection mold included in a sheet-decorating injection molding apparatus in a preferred embodiment according to the present invention.
Figure 2:
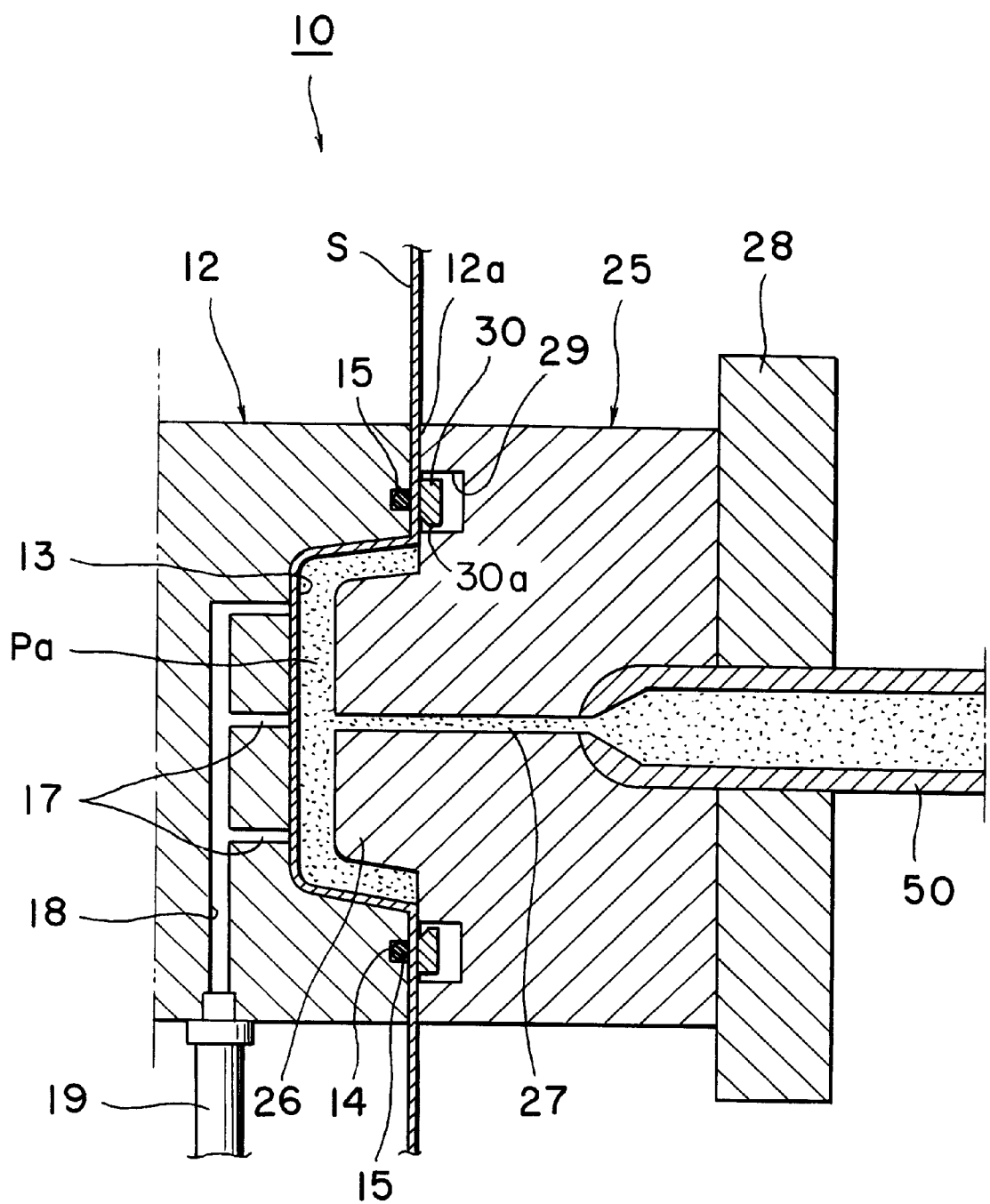
FIG. 2 is a schematic sectional view of the injection mold in a clamped state.

Referring to FIGS. 1 and 2, a sheet-decorating injection molding apparatus 10 in a preferred embodiment according to the present invention employs an injection mold having a movable mold 12, i.e., a female mold, provided with a recess 13 having a cavity surface of a shape complementary to the shape of a surface of a molding to be molded therein, and a fixed mold 25, i.e., a male mold. The movable mold 12 is fixedly mounted on a movable platen which is moved by a ram of a hydraulic actuator serving as a mold operating means in horizontal directions as viewed in FIG. 2 to move the movable mold 12 toward and away from the fixed mold 25. The movable mold 12 and the fixed mold 25 may be disposed in a vertical arrangement and the movable mold 12 may be vertically moved toward and away from the fixed mold 25. Generally, an ejecting mechanism for ejecting a molding from the injection mold is contained in an operation chamber, not shown, formed in a bottom portion of the movable mold 12. In this embodiment, the operation chamber contains a sheet clamper driving mechanism including a hydraulic actuator or a pneumatic actuator for driving a sheet clamper 30 having the shape of a frame for holding a decorative sheet S on the parting surface 12a of the movable mold 12. An ejector pin driving mechanism included in a conventional injection molding machine may be employed for driving the sheet clamper 30.

Figure 3:
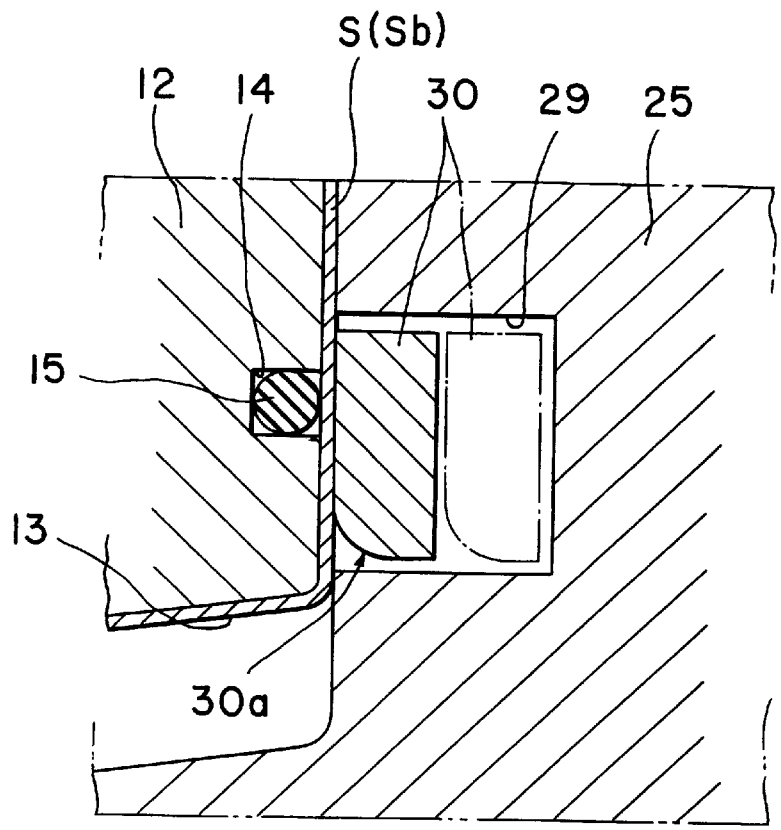
FIG. 3 is an enlarged, schematic, fragmentary sectional view of a portion of the injection mold of FIG. 2 around a sheet clamper.
Figure 5A:
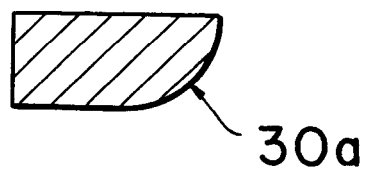
FIGS. 5(A) to 5(F) are sectional views of portions of sheet clampers in modifications.

The sheet clamper 30 has a substantially rectangular shape and is formed so as to surround the recess 13. As shown in FIG. 1, the sheet clamper 30 is joined to the free ends of four operating rods 24 slidably fitted in through holes 35 formed in the four corners of the movable mold 12. The sheet clamper 30 is moved toward and away from the parting surface 12a of the movable mold in directions perpendicular to the parting surface 12a through the operating rods 24 by the sheet clamper driving mechanism. As shown in an enlarged sectional view in FIG. 3 and in a sectional view in FIG. 5(A), the inner edges, i.e., the edges on the side of the recess 13, of surfaces facing the movable mold 12 of the sheet clamper 30 are finished in smooth, convexly curved surfaces 30a, respectively.

The sheet clamper 30 may be of a type having only two opposite sides in place of having the four sides shown in FIG. 1. In this case, the two sides are provided on the upstream and downstream sides of the movable mold 12.

Figure 5B:
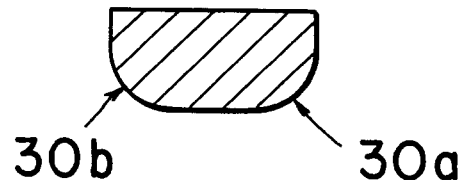
Figure 5C:
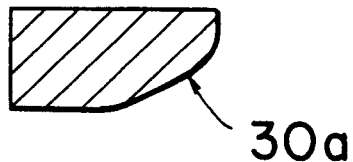
Figure 5D:
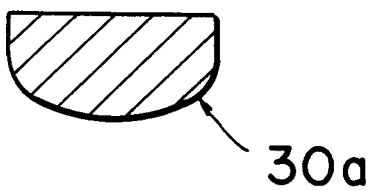
Figure 5E:
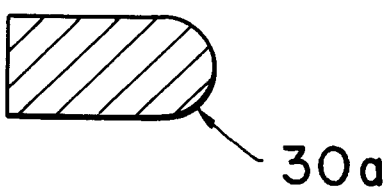
Figure 5F:
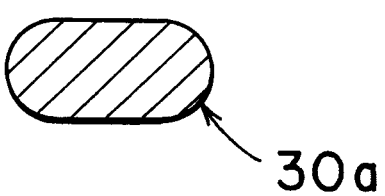
Figure 8:
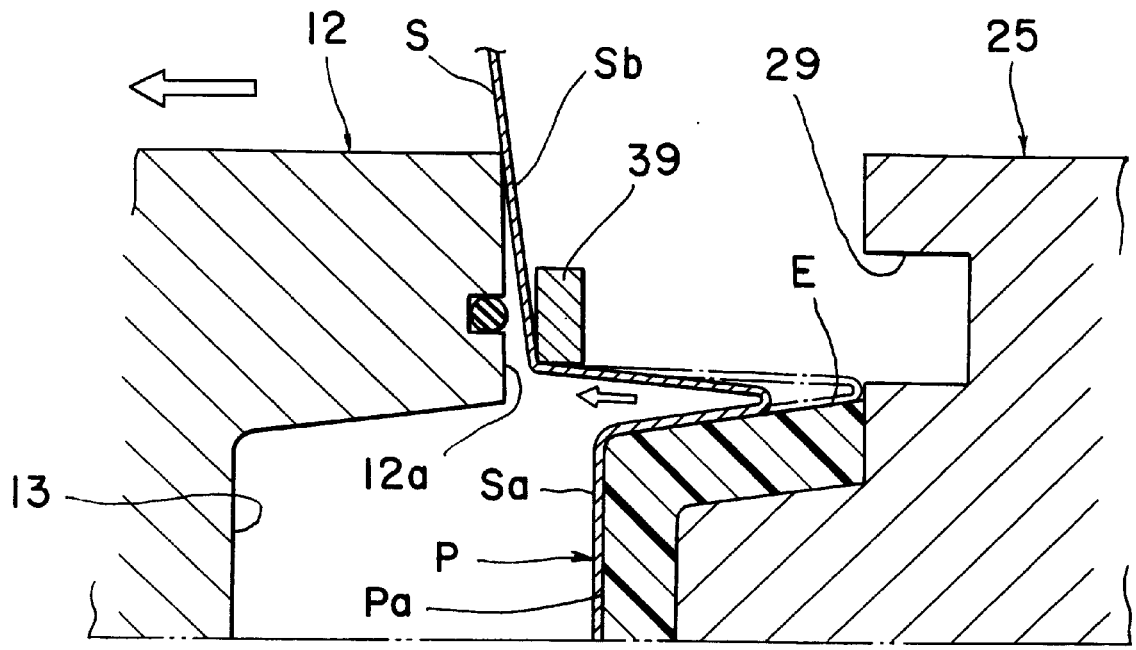
FIG. 8 is a schematic, fragmentary sectional view of an injection mold and a sheet clamper included in a conventional sheet-decorating injection molding apparatus.
Figure 9:
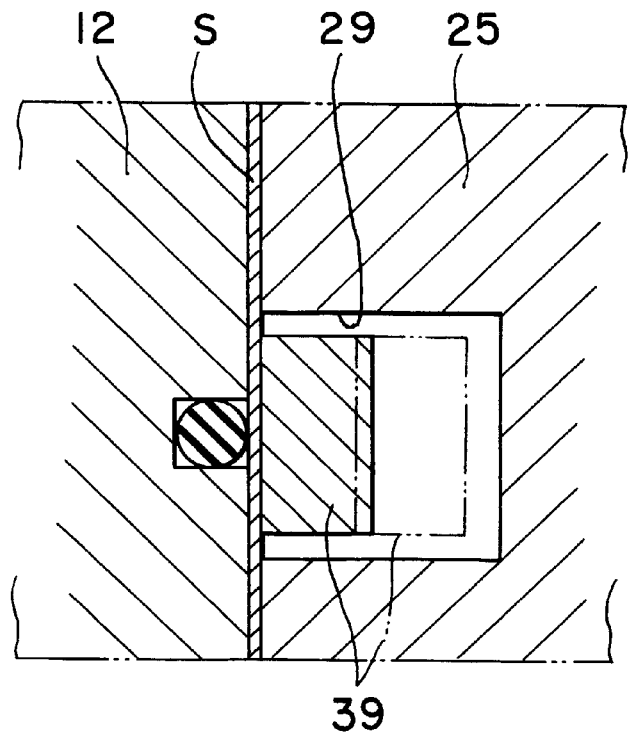
FIG. 9 is an enlarged, schematic, fragmentary sectional view of the injection mold and the sheet clamper shown in FIG. 8.

In modifications, a sheet clamper may have surfaces facing the movable mold 12 and having inner and outer edges rounded in smooth convexly round surfaces 30a and 30b, respectively, as shown in FIG. 5(B), a sheet clamper may have surfaces facing the movable mold 12 to have inner edges chamfered in slopes 30a and ridges rounded as shown in FIG. 5(C), a sheet clamper may have surfaces facing the movable mold 12 and formed in convexly curved surfaces, respectively, as shown in FIG. 5(D), a sheet clamper may have inner side surfaces formed in convexly curved surfaces as shown in FIG. 5(E), and a sheet clamper may have inner and outer side surfaces formed in convexly curved surfaces as shown in FIG. 5(F).

The sheet clamper 30 is made of a metal, such as iron or copper, or a ceramic material. It is preferable to coat at least the surfaces facing the movable mold 12 and the inner side surfaces of the sheet clamper 30 with a film of a resin which will exert low frictional resistance on the decorative sheet S, such as a fluorocarbon resin, a silicone resin or a polyolefin resin.

As shown in FIG. 2, the movable mold 12 is provided with suction holes 17 opening into the recess 13 and connected through a suction passage 18 and a pipe 19 to an external vacuum pump. An annular groove 14 is formed in the parting surface 12a of the movable mold 12 so as to surround the recess 13, and an o-ring 15 is fitted in the annular groove 14 to seal a space between the recess and the decorative sheet S when the decorative sheet S is pressed against the parting surface 12a of the movable mold 12 by the sheet clamper 30.

As also shown in FIG. 2, the fixed mold 25 is fixedly mounted on a stationary platen 28 joined to a nozzle 50 of an injection unit included in the sheet-decorating injection molding apparatus. The fixed mold 25 has a core 26 in its central portion and is provided with a runner 27 through which a molten resin injected through the nozzle 50 of the injection unit flows into a cavity formed between the movable mold 12 and the fixed mold 25. The runner is connected to a gate. The fixed mold is provided in a portion thereof corresponding to the sheet clamper 30 with a groove 29 of a rectangular cross section capable of receiving the sheet clamper 30 therein and having a depth enough to permit the sheet clamper 30 to be separated from the decorative sheet S in a state where the injection mold is closed.

The decorative sheet S employed in this embodiment is a laminated sheet consisting of a 125 μm thick acrylic resin base sheet, a decorative layer of a wood grain pattern formed by printing an acrylic resin ink on the base sheet, and an adhesive layer of a vinyl chloride-vinyl acetate copolymer adhesive. The decorative sheet S is attached closely to and integrally incorporated into a resin molding Pa.

The decorative sheet S is provided with positioning marks (register marks), such as marks "+", marks "−" or marks "I" for the accurate positioning thereof relative to the recess 13 of the movable mold 12 (resin molding to be formed). The operation of a decorative sheet feed mechanism may be controlled on the basis of the output signals of image sensors or photosensors mounted on the movable mold 12 to detect the positioning marks formed on the decorative sheet S. If the decorative sheet S is one which does not need to be positioned very accurately, such as an unfigured decorative sheet or a decorative sheet carrying a repetitive pattern, a predetermined length of the pattern sheet may be fed by controlling a stepping motor or the like included in the decorative sheet feed mechanism. The decorative sheet S must be kept taut on the parting surface 12a of the movable mold 12.

Although the decorative sheet S may be either a laminated decorative sheet to be integrally incorporated into a resin molding or a transfer decorative sheet having a decorative layer and a base sheet supporting the decorative layer and to be removed from a resin molding after the decorative layer has been transferred to the resin molding, the effect of the present invention is particularly remarkable when a laminated decorative sheet is used. The base sheet may be a sheet of thermoplastic resin, such as a polyvinyl chloride resin, an acrylic resin, a polystyrene resin, an ABS resin, a polycarbonate resin, a polyester resin, a polypropylene resin or the like, and of a thickness in the range of about 20 to about 500 μm. The decorative layer may be a film of a visually aesthetic design, such as a film of a printed pattern, a colored or transparent film or a metal thin film, or a functional film, such as a hard film, an antidim film or a conductive film.

In the sheet-decorating injection molding apparatus 10, decorative sheets S wound in a roll are fed one at a time by a pair of feed rollers. A vertically movable gripper grips the leading edge of the decorative sheet S, and pulls the leading edge of the decorative sheet S to a position near a sheet delivery side of the movable mold 12 so that the decorative sheet S is extended in a space between the sheet clamper 30 and the movable mold 12 so as to cover the parting surface 12a and the recess 13 of the movable mold 12. The gripper transfers the leading edge of the decorative sheet S to a fixed gripper disposed near the lower end of the movable mold 12. The fixed gripper holds the decorative sheet S taut over the parting surface 12a of the movable mold 12. Then, the rods 24 are retracted to press the decorative sheet S against the parting surface 12a of the movable mold 12 by the sheet clamper 30 to hold the decorative sheet fixedly on the movable mold 12.

Subsequently, the following processes are carried out sequentially in the order of a sheet cutting process for cutting the decorative sheet S from a continuous web of decorative sheets S with an edge tool or a heating wire, a softening process for heating and softening the decorative sheet S by a hot plate or the like, a drawing process for drawing the softened decorative sheet S by vacuum forming which exerts suction to the decorative sheet S through the suction holes 17 so that the decorative sheet S extends contiguously with the surface of the recess 13 of the movable mold 12, a mold clamping process for clamping the injection mold by moving the movable mold 12 toward the fixed mold 25 so that a cavity is formed between the movable mold 12 and the fixed mold 25, an injection molding process for injecting a fluid resin, such as a molten resin, through the fixed mold 25 into the cavity to form a resin molding Pa, and a mold opening process for separating the movable mold 12 from the fixed mold 25 to open the injection mold after the molten resin injected into the cavity has been solidified and after the decorative sheet S has been bonded to the resin molding Pa.

The fluid resin to be injected by the injection unit into the cavity is a well-known resin for sheet-decorating injection molding; for example, a molten thermoplastic resin, such as an ABS resin (acrylonitrile-(ethylene-polypylene-diene terpolymer)-styrene resin), a polystyrene resin, a polycarbonate resin or a polypropylene resin, or a two-component resin or a catalytic setting resin, such as a polyurethane resin or an unsaturated polyester resin The sheet clamper 30 fixedly holding the decorative sheet S on the movable mold 12 is separated from the decorative sheet S at a timing during a period between the completion of the mold clamping process and the start of the mold opening process and the sheet clamper 30 is moved further into the groove 29 immediately after the start of the mold opening process according to the increase of the distance between the movable mold 12 and the fixed mold 25.

Figure 4:
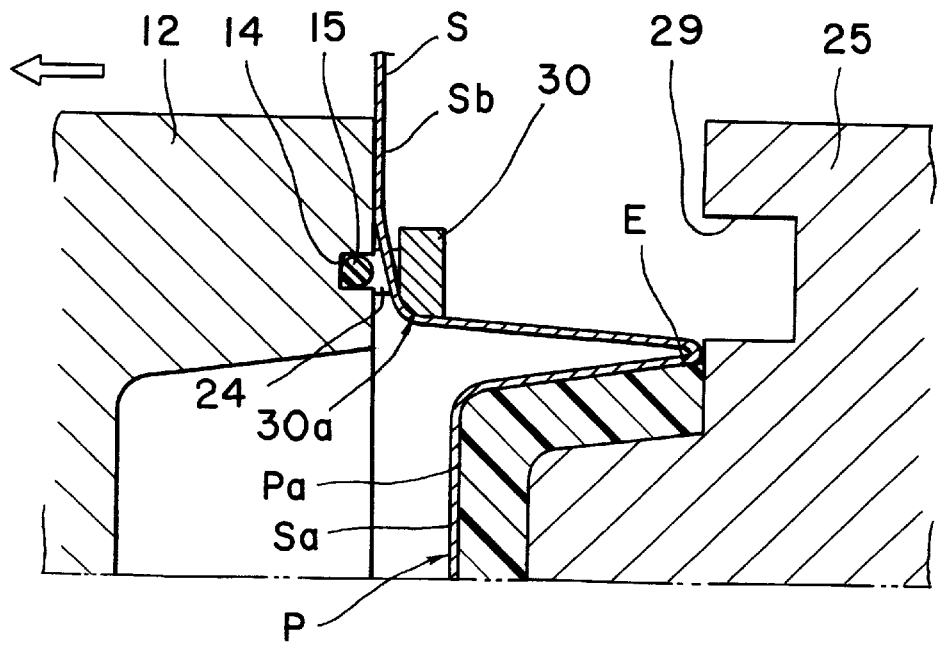
FIG. 4 is an enlarged, schematic, fragmentary sectional view of a portion of the injection mold of FIG. 2 around a sheet clamper, for assistance in explaining a mold opening operation of the sheet-decorating injection molding apparatus of FIG. 1.

As mentioned above, at least the inner edges of surfaces facing the movable mold 12 of the sheet clamper 30 are finished in the smooth, convexly curved surfaces 30a, and the sheet clamper 30 fixedly holding the decorative sheet S on the movable mold 12 is moved in the groove 29 of the fixed mold 25 to separate the same from the decorative sheet S at a timing during a period between the completion of the mold clamping process and the start of the mold opening process. Therefore, the sheet clamper 30 moves away from the fixed mold 25 as the movable mold 12 is moved away from the fixed mold 25 as shown in FIG. 4 after the start of the mold opening process, and a marginal portion Sb of the decorative sheet S surrounding the effective portion Sa of the decorative sheet S bonded to the resin molding Pa and held between the sheet clamper 30 and the parting surface 12a of the movable mold 12 move through a space between the sheet clamper 30 and the parting surface 12a of the movable mold 12 sliding along the smooth, convexly curved surface 30a of the sheet clamper 30 without being caught by the sheet clamper 30 as the movable mold 12 is moved further away from the fixed mold 25. Therefore, the effective portion Sa bonded to the solidified resin molding Pa of the decorative sheet S (particularly, portions of the decorative sheet around the edges E of the sheet-decorated molding P) is not pulled by the movable mold 12 and hence the portions of the decorative sheet S around the edges E of the sheet-decorated molding P will not be peeled off or the decorative sheet S will not be broken.

For separating the sheet clamper 30 from the decorative sheet S on the movable mold 12, one of the following modes may be adopted.

1) The sheet clamper 30 is moved until it abuts against the bottom of the groove 29, and this condition is maintained after the start of the mold opening process;

2) The sheet clamper 30 is moved until it abuts against the bottom of the groove 29, and after the start of the mold opening process the clamper 30 is further moved as the movable mold moves away from the fixed mold;

3) The sheet clamper 30 is moved away from the parting surface 12a within the depth of the groove 29 before the start of the mold opening process, and immediately after the start of the mold opening process, the clamper 30 is moved further at a time so as to abut against the bottom of the groove 29.

After the completion of the mold opening process, the molding removing process for removing the sheet-decorated molding P formed by bonding the decorative sheet S to the resin molding Pa, from the fixed mold 25, and the trimming process for removing unnecessary portions of the decorative sheet S are carried out.

In a modification shown in FIGS. 6 and 7, a sheet cutter 40 having an edge tool or a heating wire for cutting the web of decorative sheets S along the width is supported on the upper section of the sheet clamper 30, and a groove 41 capable of receiving the cutter 40 is formed in the parting surface 12a of the movable mold 12. A decorative sheet cutting operation for cutting of a leading decorative sheet S from the web of decorative sheets S by the sheet cutter 40 may be carried out in synchronism with a decorative sheet clamping operation for clamping the leading decorative sheet S to the parting surface 12a of the movable mold 12 by the sheet clamper 30. When the leading decorative sheet S is thus cut off the web of decorative sheets S before heat is applied thereto, decorative sheets S succeeding the leading decorative sheet S held on the movable mold 12 are not subjected to the adverse effects of heat applied to the leading decorative sheet S held on the movable mold 12, such as inducing thermal stress in the succeeding decorative sheets S and straining the succeeding decorative sheets S.

Although the invention has been described in its preferred forms with a certain degree of particularity, obviously many changes and variations are possible therein. It is therefore to be understood that the present invention may be practiced otherwise than as specifically described herein without departing from the scope and spirit thereof.

What is claimed is:

1. A sheet-decorating injection molding method comprising the steps of:

keeping an injection mold in a state in which a male mold having a molding surface and female mold having a forming recess are separated from each other to provide a space therebetween;

feeding a decorative sheet having an effective portion and a marginal portion surrounding the effective portion into said space in such a manner that the marginal portion of the decorative sheet faces a parting surface of the female mold;

moving a sheet clamper having a smooth, convexly curved surface on an inner edge thereof to cause the marginal portion of the decorative sheet to be pressed closely against said parting surface by the sheet clamper;

closing the injection mold so that the male mold and the female mold are clamped together to define a molding cavity formed by said effective portion of said decorative sheet and said molding surface of said male mold forming recess and that said sheet clamper is movably received in a groove formed in the male mold;

injecting a molten resin through said male mold into said molding cavity to mold an article having said effective portion of said decorative sheet bonded thereto;

opening the injection mold by relatively moving the female mold away from the male mold with the decorative sheet kept bonded to said article and said article kept in contact with said molding surface of said male mold;

moving the sheet clamper in said groove away from the parting surface of the female mold to release the decorative sheet at a time during a period between completion of said step of closing the injection mold and start of said step of opening the injection mold; and causing the marginal portion of the decorative sheet surrounding the effective portion of the decorative sheet bonded to the article which is in contact with the molding surface of the male mold to slide along the smooth, convexly curved surface of the sheet clamp without being caught by the sheet clamper as the female mold is moved further away from the male male thereby preventing, by the sliding of the marginal portion along the smooth, convexly curved surface of the sheet clamp, the effective portion of the decorative sheet from peeling from the article.

2. The sheet-decorating injection molding method according to claim 1, further comprising the step of:

moving the sheet clamper further away from the parting surface of the female mold as the female mold is relatively moved further away from the male mold after the start of the step of opening the injection mold.

* * * * *